(12) United States Patent
Kanda et al.

(10) Patent No.: US 7,029,089 B2
(45) Date of Patent: Apr. 18, 2006

(54) METHOD FOR RECORDING IMAGE CORRESPONDING TO POSITIONAL INFORMATION ON RECORDING MEDIUM AND RECORDING APPARATUS

(75) Inventors: Hidehiko Kanda, Ohta-ku (JP); Jiro Moriyama, Ohta-ku (JP)

(73) Assignee: Canon Kabushiki Kaisha, Tokyo ( * ) Notice: Subject to any disclaimer, the term of this patent is extended or adjusted under 35 U.S.C. 154(b) by 235 days.

(21) Appl. No.: 10/716,026

(22) Filed: Nov. 17, 2003

(65) Prior Publication Data
US 2004/0100658 A1    May 27, 2004

(30) Foreign Application Priority Data
Nov. 19, 2002   (JP)   ............... 2002/335772

(51) Int. Cl.
*B41J 29/393*   (2006.01)

(52) U.S. Cl. ...................................... 347/19
(58) Field of Classification Search .................. 347/19
See application file for complete search history.

(56) References Cited

U.S. PATENT DOCUMENTS

| | | | | |
|---|---|---|---|---|
| 5,477,012 A | * | 12/1995 | Sekendur | 178/18.09 |
| 5,652,412 A | * | 7/1997 | Lazzouni et al. | 178/18.01 |
| 5,661,506 A | * | 8/1997 | Lazzouni et al. | 345/179 |
| 6,613,403 B1 | * | 9/2003 | Tan et al. | 428/29 |
| 2002/0024542 A1 | * | 2/2002 | Ericson et al. | 347/5 |
| 2002/0080396 A1 | * | 6/2002 | Silverbrook et al. | 358/1.15 |

* cited by examiner

Primary Examiner—K. Feggins
Assistant Examiner—Rene Garcia, Jr.
(74) Attorney, Agent, or Firm—Canon U.S.A. Inc I.P. Div

(57) ABSTRACT

When an image representing positional information, formed with black spot pattern and the other image formed with color inks including cyan, magenta, and yellow are recorded on the same recording medium, the gradient of color data is corrected during data preparation of colors used for recording the image other than the black spot pattern, according to the duty of the black spot pattern. Thus, even if the other image is recorded to overlap with the black spot pattern, color changes of the image can be prevented to produce a high-quality image.

10 Claims, 7 Drawing Sheets

FIG. 6

| R | G | B |
|---|---|---|
| 0 | 0 | 0 |
| 1 | 1 | 1 |
| 16 | 16 | 16 |
| 32 | 32 | 32 |
| ········ | ········ | ········ |

→

| C | M | Y |
|---|---|---|
| 204 | 255 | 230 |
| 202 | 253 | 228 |
| 150 | 200 | 180 |
| 136 | 170 | 153 |
| ········ | ········ | ········ |

FIG. 7

| R | G | B |
|---|---|---|
| 0 | 0 | 0 |
| 1 | 1 | 1 |
| 16 | 16 | 16 |
| 32 | 32 | 32 |
| ........ | ........ | ........ |

→

| C | M | Y |
|---|---|---|
| 150 | 200 | 180 |
| 138 | 175 | 157 |
| 120 | 151 | 136 |
| 101 | 127 | 115 |
| ........ | ........ | ........ |

METHOD FOR RECORDING IMAGE CORRESPONDING TO POSITIONAL INFORMATION ON RECORDING MEDIUM AND RECORDING APPARATUS

BACKGROUND OF THE INVENTION

1. Field of the Invention

The present invention relates to recording apparatuses and recording methods, and particularly to an apparatus and a method for recording an image representing predetermined positional information and the other image on the same recording medium.

2. Description of the Related Art

Recording apparatuses have been generally known which use a plurality of color inks including cyan (C), magenta (M) and yellow (Y), and further black (Bk).

On the other hand, as a recording medium capable of handwriting thereon, a type has been known over which positional information has been previously printed. This positional information includes information designating the position where the positional information is recorded on the recording medium, that is, information whose recording position is associated with coordinates on the recording medium. The positional information is, for example, expressed by a combination pattern of a plurality of black spots recorded on the recording area.

For handwriting characters and the like on such a recording medium including positional information recorded thereon, a pen integrated with a miniature camera capable of detecting and recording images is used. The camera detects the black spot pattern on the recording medium at the vicinity of the pen point. Thus, the character position and the characters, which is on the locus of pen movement, are recognized from the pattern. The recognition of the handwritten characters and the like may be carried out by an information processor, such as a personal computer, to which the signal detected by the camera is transmitted by, for example, radio communication. This technique for inputting handwritten characters and the like with a pen is hereinafter referred to as "pen input method" in some cases.

However, since the above-described positional information has previously been printed on a recording medium, users must purchase, for example, recording medium with the positional information printed thereover. Consequently, positional information cannot be arbitrarily recorded on the recording medium. For example, the shape, size, relative position and so on of the region identifying a handwriting position cannot be flexibly set. Furthermore, if an image is recorded on a recording medium with the positional information printed thereon using a recording apparatus, the image prevents the positional information from being read. Thus the positional information may not function undesirably. Users cannot record an arbitrary image on a recording medium with the positional information printed thereon using a recording apparatus.

The positional information can be recorded by a recording apparatus. In this instance, however, recorded positional information may negatively affect the recording quality of images.

SUMMARY OF THE INVENTION

Accordingly, the present invention is intended to solve the above-described problems, and an object of the present invention is to provide a method for arbitrarily recording the positional information and images while preventing degradation of recording quality.

In the present invention, in order that positional information representing positions on a recording medium and the other image are recorded on the same recording medium, data for recording the image other than the positional information is corrected according to the positional information image.

According to an aspect of the present invention, a method is provided for recording, on one recording medium, a positional information image representing positional information corresponding to at least positions on the recording medium and the other image, using a recording apparatus that applies a recording material onto the recording medium. The method includes the step of obtaining information on recording of the positional information image according to record data for recording the positional information image. According to the obtained information, record data of said the other image is corrected so that a predetermined recording property of the other image is varied, in a correction step. In a recording step, the positional information image and the other image corrected are recorded on the recording medium.

According to another aspect of the present invention, a recording apparatus for forming an image on a recording medium is provided. The recording apparatus includes recording means for performing recording by applying a recording material onto the recording medium. The recording means records at least one of a positional information image representing positional information corresponding to the position where the positional information image is recorded and the other image. Control means is also provided in the recording apparatus for control the recording such that the recording means records the positional information image with a recording material capable of being detected by a predetermined detector, and the other image with another recording material incapable of being detected by the detector. Correction means corrects record data for recording the image other than the positional information image, according to record data for recording the positional information image.

In the present invention, the record data of an ordinary image other than a positional information image is corrected corresponding to the recording of the positional information image so that a predetermined recording property of the other image is varied. Accordingly, if the positional information image is expressed by a black spot pattern, the record data for recording the ordinary image, such as the gradient of the C, M, and Y colors, can be reduced by an amount of recorded black spots to totally reduce the density of the C, M, and Y color mixture. Consequently, black tinge over the recorded image can be prevented.

As a result, users can arbitrarily record the positional information image and the other image. In addition, if these images are recorded on the same recording medium, the recording quality can be maintained.

Further objects, features and advantages of the present invention will become apparent from the following description of the preferred embodiments (with reference to the attached drawings).

BRIEF DESCRIPTION OF THE DRAWINGS

FIG. 6 is a schematic representation of an LUT for an ordinary image used in the image processing shown in FIG. 5.

FIG. 7 is a schematic representation of an LUT for a black spot pattern used in the image processing shown in FIG. 5.

DESCRIPTION OF THE PREFERRED EMBODIMENTS

Preferred embodiments of the present invention will now be described with reference to the drawings.

First Embodiment

Figure 1:
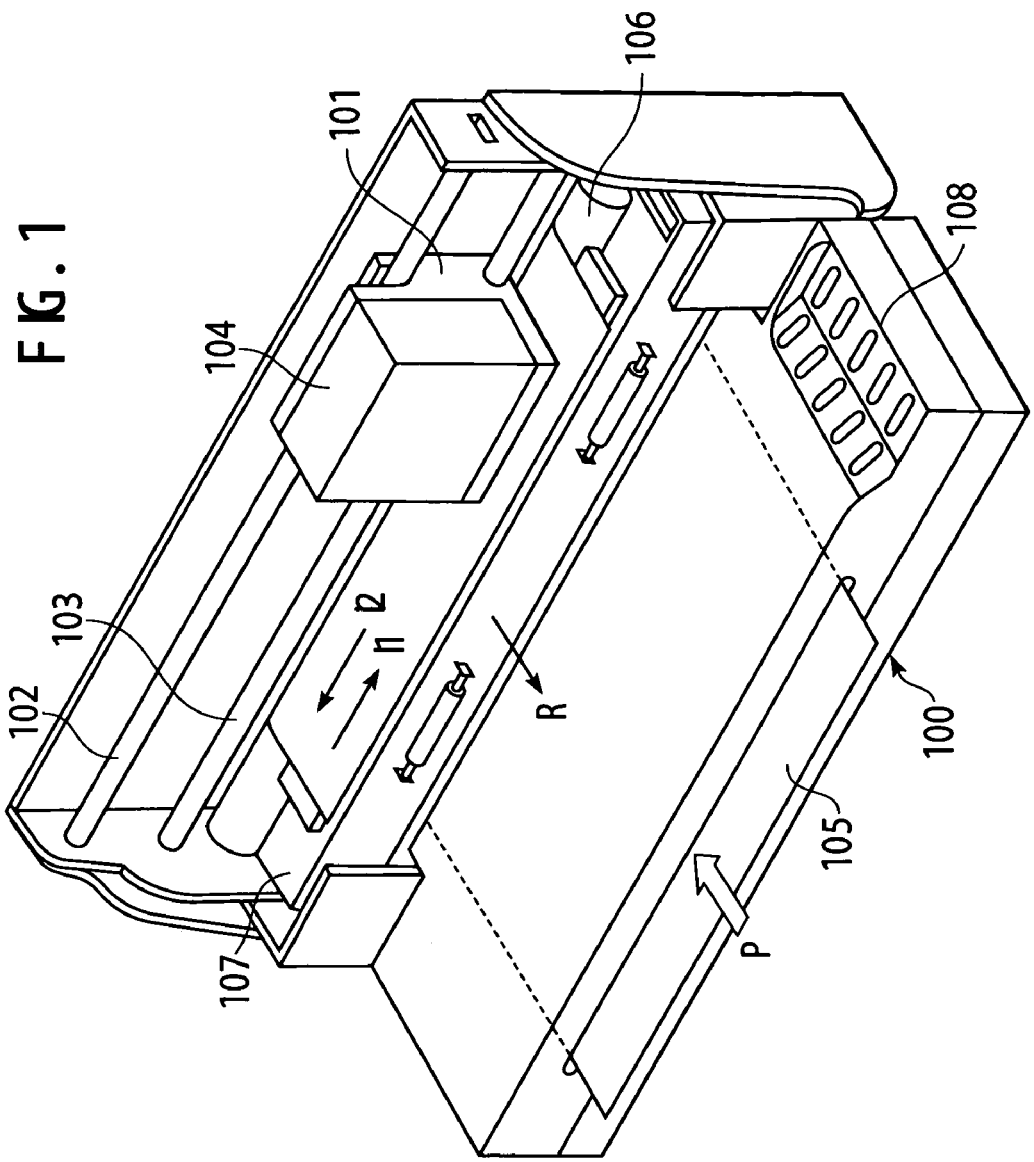
FIG. 1 is a representation of an ink jet recording apparatus used in the present invention as a recording apparatus.

In the first embodiment, the present invention will be described using an ink jet recording apparatus, which discharges ink onto a recording medium. FIG. 1 shows the structure of the ink jet recording apparatus of the present invention.

A recording medium 105 is fed in the direction designated by arrow P from a feeding position in the front of an ink jet recording apparatus (printer, in the first embodiment) 100. The feed direction of the recording medium 105 is reversed at the back of the recording apparatus 100, and the recording medium 105 is delivered in a secondary scanning direction, designated by arrow R, to a recordable area of a recording head 104, by a delivery roller 106. Under the recording medium 105 in the recordable area, a platen 107 is disposed. A carriage 101 shifts in primary scanning directions, designated by arrows I1 and I2, along guide axes 102 and 103, and thus reciprocally scans the scan area including the recordable area by driving a stepping motor, not shown in the figure. The carriage 101 holds the recording head 104 capable of discharging ink from discharge holes. After the recording head 104 has finished one primary scan, the recording medium 105 is delivered a predetermined distance in the secondary scanning direction R and prepares for the next primary scan. By repeating the primary scan and secondary scan, an image is recorded on a sheet of the recording medium 105.

The recording head 104 is detachably or integrally combined with an ink reservoir (not shown) containing ink to constitute an ink jet cartridge. The recording head 104 records an image on the recording medium 105 by discharging the ink supplied from the ink reservoir from the discharge holes in the downward direction of the figure. Reference numeral 108 designates a portion where switches and a display portion are disposed. The switch portion is used for switching power on/off, recording modes, and the like. The display portion is structured so as to display the state of the recording apparatus.

The recording head 104 can discharge inks of four colors Y (yellow), M (magenta), C (cyan), and Bk (black). The Y, M, C inks are each discharged from 128 discharge holes, and the Bk ink is discharged from 320 discharge holes. The discharge holes of each color ink are aligned in the secondary scanning direction with a pitch of about 42 μm, equivalent to 1/600 dpi (dots per inch). The recording head 104 includes a heater being an electrothermal converter for each discharge hole. The heater generates thermal energy to bubble ink so that the ink is discharged by bubble pressure. The recording head 104 operates at a frequency of 15 kHz and it can record at a density of 600 dpi in the primary scanning direction. Hence, the shifting speed in the primary scanning direction of the carriage 101 is 25 in/s (inches per second).

The Bk ink comprises a pigment containing carbon black as the coloring material (hereinafter referred to as carbon Bk ink in some cases), and the Y, M, and C inks each comprise a dye as the coloring material (hereinafter referred to as dye ink in some cases), as described later. In the ink jet recording apparatus of the present embodiment, the discharge quantity of the carbon Bk ink is set at about 30 pL (picoliter), and the discharge quantities of the Y, M, C dye inks are each set at about 5 pL. Discharge operation is controlled so that these quantities of the inks are discharged for each dot. The following description is on the precondition that the recording apparatus has a recording resolution of 600×600 dpi and uses a common recording medium referred to as plain paper. A droplet of the Bk ink discharged from the recording head 104 forms one dot in a 1/600-inch square recording area, and droplets of the Y, M, and C color inks form two dots in a 1/600-inch square recording area. These values are varied according to the characteristics of the recording medium 105, even if only plain paper is used. The recording apparatus of the present embodiment is designed according to the characteristics of generally available, widely used recording medium.

Figure 2:
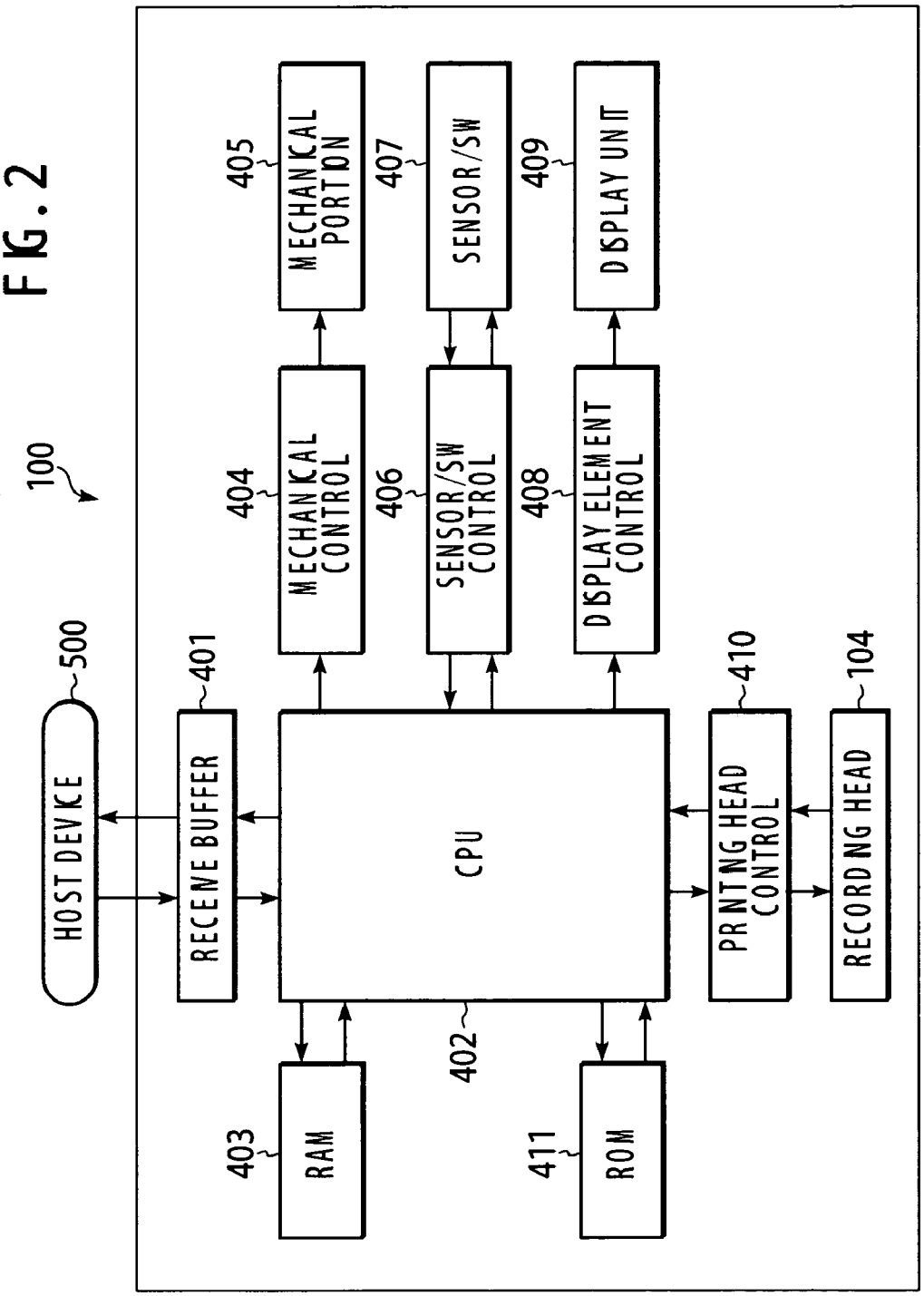
FIG. 2 is a block diagram showing the main part configuration involved in control of the ink jet recording apparatus.

FIG. 2 is a block diagram showing the main part configuration involved in control of the above-described ink jet recording apparatus. Record data of characters and images to be recorded is transmitted to the recording apparatus 100, being the guest device, from a host device 500, and the data is stored in a receive buffer 401. The recording apparatus 100 transmits data for checking whether data is correctly transmitted and for informing of its own operative state to the host device 500. The host device 500 may be a personal computer (PC) or a digital camera that can transmit data to the recording apparatus 100.

The data stored in the receive buffer 401 is processed into data for recording under the control of the CPU 402 while the recording head 104 is scanning in the primary scanning direction, and subsequently stored in a print buffer in a random access memory (RAM) 403. The data in the print buffer is transferred to the recording head 104 by a recording head control 410. The recording head 104 is driven according to the data, thereby discharging the color inks to record images including characters. The recording head control 410 also detects information representing the state of the recording head 104, such as temperature, transmits the information to a CPU 402, and controls the operation of the recording head 104 according to the information.

A mechanical control 404 controls the operation of a mechanical portion 405 including, for example, a carriage motor for shifting the carriage 101 and a line feed motor for delivering the recording medium 105, according to instruction from the CPU 402. A sensor/SW control 406 transmits signals from a sensor/SW portion 407 including various sensors and switches to the CPU 402. A display element control 408 controls a display unit 409 including LEDs or liquid crystal display elements of display panels according to instruction from the CPU 402.

Figure 3:
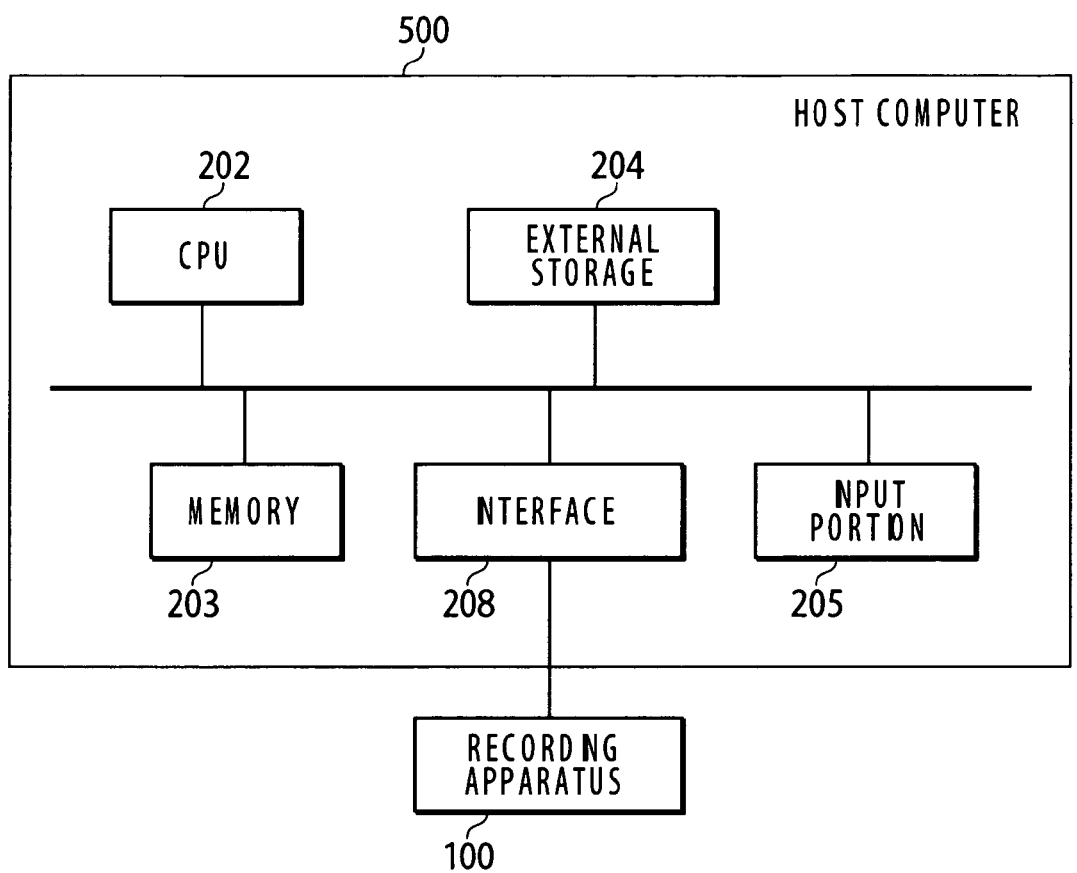
FIG. 3 is a block diagram showing the configuration of a host computer being the host device shown in FIG. 2.

The recording apparatus 100 selects a recording mode from a plurality of recording modes according to the selection input by a user and records images in the selected recording mode. For example, if high-speed recording is desired, a one-pass recording mode is selected; if high-quality recording is desired, a 16-pass recording mode is selected. In the one-pass recording mode, the recording head 104 records an image by scanning once for an identical recording area; in the 16-pass recording mode, the recording head 104 records an image by scanning in the primary scanning direction 16 times for an identical recording area while shifting (that is, delivering the recording medium) in the secondary direction in predetermined distances. FIG. 3 is a block diagram showing the configuration of the host computer 500 serving as the host device shown in FIG. 2. The host computer 500 and the recording apparatus 100 described with reference to FIG. 2 constitute a recording system.

Figure 4:
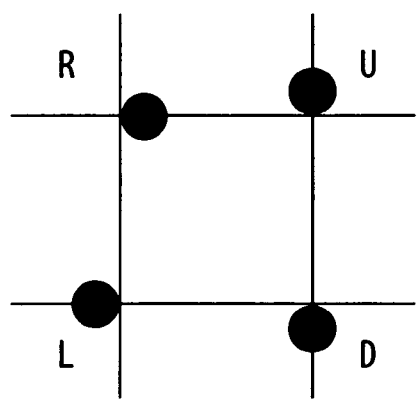
FIG. 4 is a representation of an example of positional information used in the pen input method.
Figure 5:
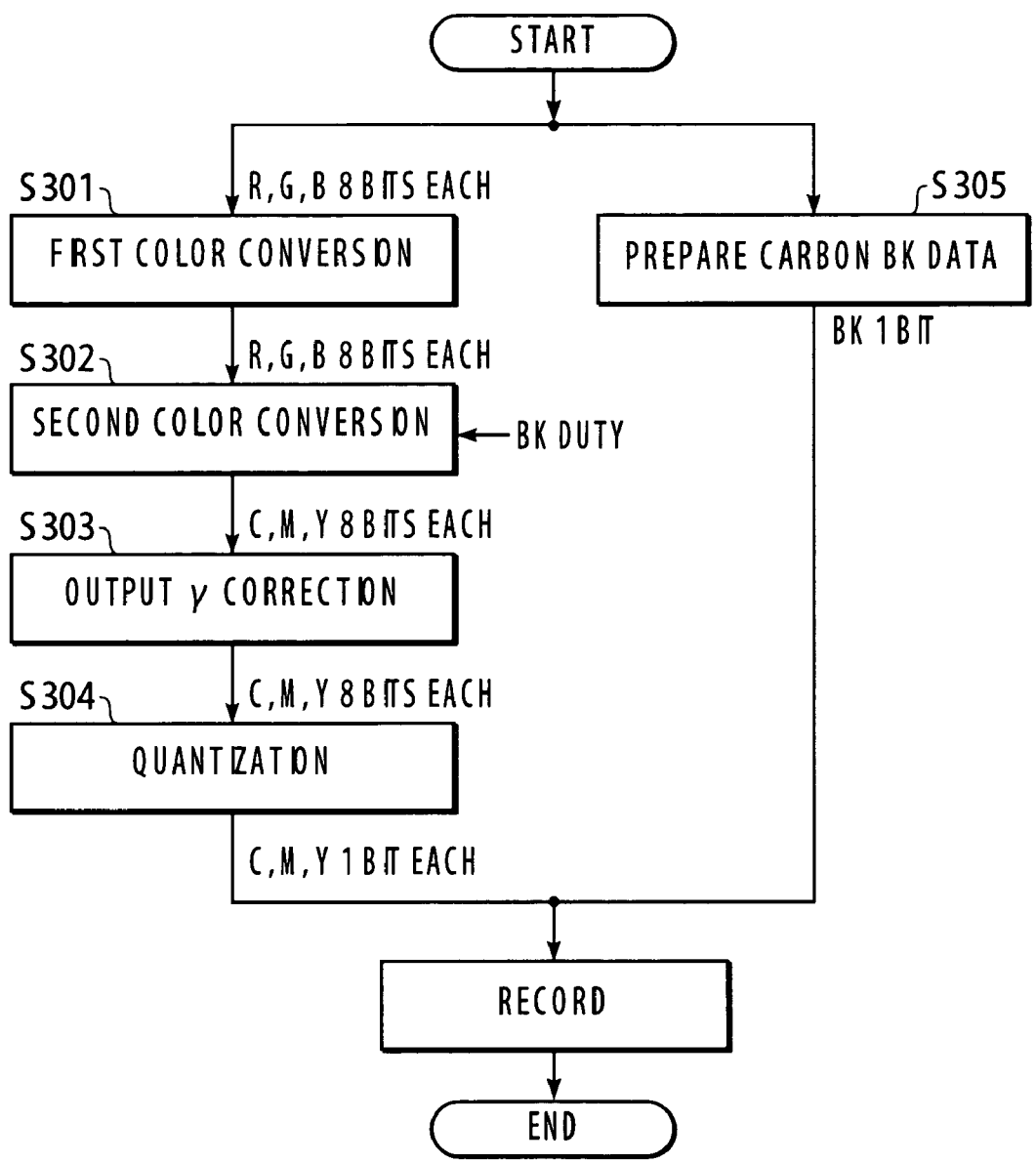
FIG. 5 is a flow chart of a procedure of image processing according to an embodiment of the present invention.

The host computer 500 includes a CPU 202, a memory 203, an external storage 204, an input portion 205, an interface 208 between the host computer 500 and the recording apparatus 100. The CPU 202 performs various types of processing according to programs stored in the memory 203. For example, processing for preparing and editing an image including characters is performed according to a user input from the input portion 205. For recording such an image, image processing such as color conversion, shown in FIG. 5, is performed by a printer driver, which is one of the programs, to prepare data used in the recording apparatus 100. Specifically, R, G, and B data of the prepared and edited image are subjected to predetermined image processing, such as color conversion, output γ correction, and quantization (binarization), to yield C, M, and Y binary data. In this data processing, binary data for the carbon Bk ink for recording a black spot pattern, described later with reference to FIG. 4, is obtained. The host computer 500, which is connected to the recording apparatus 100 through the interface 208 transmits recording data obtained by the image processing to the recording apparatus 100 to perform recording.

The programs may be stored in the external storage 204 or supplied from an external device.

FIG. 4 is a representation of an example of positional information used in the pen input method. In the present embodiment, the recording apparatus 100 records such a pattern image representing positional information. Specifically, a positional information image is recorded on a recording medium with the carbon Bk ink, and ordinary images other than the positional information image (hereinafter referred to as other images in some cases) are recorded with C, M, and Y inks.

The positional information is recorded in a predetermined pattern form of black spots dotted, for example, over the entire recordable area on the recording medium 105. Specifically, the black spots are recorded on the recording medium 105 with reference to assumed lattice points arranged at predetermined intervals. For example, a black spot is provided at the vicinity of each of lattice points arranged at intervals of about 0.3 mm. As shown in FIG. 4, there are four recording positions consisting of position U above a lattice point, position D below the lattice point, position R at the right of the lattice point, and position L at the left of the lattice point for each black spot. A positional pattern formed with a predetermined plurality of the black spots constitute "positional information". For example, a pattern of black spots recorded at the vicinities of the respective lattice points in a predetermined two-dimensional arrangement defining a unit region is varied from one unit region to another. Thus, the positional pattern, that is, a combination of above-described positions U, D, R, and L represents the "positional information" of the unit region. As described above, by detecting the black spot pattern with a camera at the end of a pen and reading the positional pattern as positional information for each unit region, the position on a recording medium where the pen point is placed can be known, or it can be made sure that the position where the pen point is placed is in a predetermined region on the recording medium.

In addition, the number of combinations of positions U, D, R, and L allows the positional information to represent a position in a vast virtual plane far beyond the area of a recording medium. For example, if the same positional pattern is not used twice or more for recording media, a positional pattern can identify a recording medium with the positional pattern recorded thereon by establishing correspondences between the positional patterns and the recording media.

If characters or the like are handwritten on a recording medium 105 with such positional information thereon, a pen integrated with a miniature camera (pen camera) may be used. The camera shoots the vicinity of the pen point, thereby reading positional information expressed by the black spots on the recording medium. The positional information helps the pen read images including handwritten characters. Specifically, the positional information indicates the locus of pen movement, thus helping the recognition of the handwritten characters and the like. The recognition of the handwritten characters and the like may be carried out by an information processor to which the signal detected by the camera is input.

In the present invention, in order for the camera to detect the black spot pattern, the pattern is recorded with the carbon Bk ink, and the camera has a structure capable of detecting carbon in the ink on the recording medium 105. The ordinary image other than the black spot pattern is recorded with the Y, M, and C dye inks not containing carbon. Hence, the camera does not detect these dye inks or the image formed with these inks.

FIG. 5 is a flow chart of a procedure of image processing according to the first embodiment of the present invention, and, as described above, the print driver in the host computer 500 conducts the image processing.

In the first embodiment, Bk 1-bit data for a carbon Bk ink is prepared and is used for recording a black spot pattern enabling the pen input method. One-bit data of C, M, and Y colors, which are color data for using inputted 8-bit image data (256-level gray scale) of R, G, and B colors in a recording apparatus 100, are also prepared. Since the black spot pattern is recorded on the same recording medium in the present invention, predetermined correction is performed during the preparation of the C, M, and Y data. Thus, black tinge over a recorded image can be prevented.

On starting the processing, Bk data for the carbon Bk ink is prepared in Step S305 on one route shown in FIG. 5. This data is used for recording the black spot pattern, described with reference to FIG. 4. For example, when the black spot pattern is recorded over the surface of a recording medium so that a position and contents of pen input are known, the unit regions of the black spot pattern are prepared over the surface of the recording medium so that the pattern is varied from one unit region to another. Also, for example, when a user wants to know that a predetermined area of a recording medium has been written with a specific pen, or what has been written, the unit regions are prepared over the surface of the area so that the pattern is varied from one unit region to another, as above.

On the other route of FIG. 5, the 8-bit R, G, and B data of an input image to be recorded (other than the positional information image) are, first, subjected to a first color conversion in Step S301. Specifically, the 8-bit R, G, and B data are converted into 8-bit R, G, and B data corresponding to a color reproduction area of the ink jet recording apparatus 100 with a first three-dimensional look-up table (LUT) or a color conversion table.

Then, a second color conversion is performed in Step S302. In this conversion, the R, G, and B data converted above are further converted into 8-bit data of the C, M, and Y-colors used in the recording apparatus with a second three-dimensional LUT. Thus, the R, G, and B colors in an input system are converted into the C, M, and Y colors in an output system. While three primary colors (R, G, and B) from luminants by additive process are often used for input data, for example in a display, color ink jet recording apparatuses use C, M, and Y inks as the color materials. Therefore, the color conversion above is required.

In the second color conversion, reference to the Bk data for the carbon Bk ink prepared in Step S305 is made in regions to be processed, and the second LUT is switched according to the reference. Here, the regions refer to, for example, 64 pixels of 8×8 pixels. Specifically, for processing the region where the recording duty in the recording region of the Bk data becomes a predetermined value other than zero according to the black spot Bk data prepared Step S305, the LUT shown in FIG. 7 is used. On the other hand, for processing the region where the recording duty of the Bk data becomes zero, the LUT shown in FIG. 6 is used. For example, if the black spot pattern is recorded over the surface of a recording medium, the LUT shown in FIG. 7 is used. The LUT of FIG. 7 involves the correction of C, M, and Y input data to actually recorded C, M, and Y data according to the Bk data. By referring to the Bk data in regions, high-speed processing or simple processing can advantageously be performed. For example, when a sheet with a uniform duty is used, the Bk data over the surface are compared with the same LUT. For such processing, a discrimination signal representing that the entire surface of a sheet has the same duty is prepared, and a processing is performed in which if the sheet surface has the same duty, only the LUT shown in FIG. 7 is used.

In the embodiment, the reference to the Bk data is made in predetermined regions. However, it may be performed in record pixels to be image-processed. For example, reference to a LUT may be made in pixels of 600 ppi (pixels per inch), and recording may be performed at 600 dpi (dots per inch) according to the resulting data. In this instance, it suffices to obtain information on whether the Bk data is recorded in pixels or not, in Step S302.

The LUT shown in FIG. 6 is used when the black spot pattern is not recorded with the carbon Bk ink. This LUT is of three dimensions and contains 8-bit C, M, and Y color data resulting from converting combinations of discrete 8-bit R, G, and B color data inputted in the second color conversion. As shown in FIG. 6, if inputted 8-bit R, G, and B color data are, for example, R=G=B=0, that is, the colors are black, 8-bit C, M, and Y color data become C=204, M=255, and Y=230, respectively.

On the other hand, the LUT shown in FIG. 7 is used when the black spot pattern is recorded with the carbon Bk ink. As shown in FIG. 7, if inputted 8-bit R, G, and B color data are, for example, R=G=B=0, that is, the colors are black, 8-bit C, M, and Y color data become C=150, M=200, and Y=180, respectively. As described above, when the black spot pattern is recorded with the carbon Bk ink, the gradients of the C, M, and Y colors in the black spot pattern-recording region are corrected to be reduced to a level lower than those when the black spot pattern is not recorded, corresponding to the recording of the black spot pattern. Thus, the density of recorded C, Y, and Y color mixtures is reduced to prevent black tinge over the recorded image. Although the carbon Bk ink is intrinsically unnecessary for recording of characters or images, it is used for recording the pattern for the pen input method. Hence, the Bk data is unnecessary for character or image data. Therefore color data equivalent to the carbon Bk data is corrected.

The correction does not necessarily reduce a recording property, such as density, and it may involve changes of image processing parameters, such as those of color conversion, for the ordinary image other than the black spot pattern so as to reduce negative effects on the ordinary image.

The first and second three-dimensional LUTs discretely hold data, and intermediate values between the discrete data are obtained by a known interpolation.

As described above, the 8-bit C, M, and Y color data obtained by color processing are subjected to output γ correction, that is, output γ conversion with a one-dimensional LUT in Step S303. The relationship between the number of record dots and output properties, such as reflection density, is not linear in many cases. Accordingly, by performing the output γ correction, a linear relationship between the input level of the 8-bit C, M, and Y data and output properties at that time can be ensured. Then, the 8-bit C, M, and Y color data are quantized into 1-bit C, M, and Y color data in Step S304 because the color ink jet printer (recording apparatus 100) is of binary type. The quantization is performed by a known error dispersion method or dither method. The binary data is transmitted to the recording apparatus 100 together with the Bk data of the carbon Bk ink to record the black spot pattern and the other image, in Step S306. The black spot pattern and the other image may be recorded by the same scanning operation or separate.

In the embodiment above, the preparation of the Bk data and the Y, M, and C data, shown in FIG. 5, is performed in the host device of the recording apparatus, more specifically, a PC. However, it is not limited to this, and, for example, the recording apparatus may prepare the Bk data and the Y, M, and C data. The device for preparing Bk data and Y, M, and C data, shown in FIG. 5, is herein referred to as "image processing apparatus".

In addition to preparing the carbon Bk data in the recording apparatus, the duty information of the data for each region may be transmitted to the host device. In the host device, the Y, M, and C data may be prepared as described above according to the Bk duty in the host device. The duty information can be transmitted by two-way communication between, for example, the host device and the recording apparatus. The duty information may be inputted to or held in the host device as a predetermined fixed value if the recording area of the information has been decided. Since the preparation of the carbon Bk ink data is determined according to a specific law, the recording apparatus can easily prepare it. By preparing the carbon Bk ink data in the recording apparatus, the quantity of data transferred from the host device to the recording apparatus can advantageously be reduced.

In the embodiment above, color processing for preparing the C, M, and Y color data is performed according to the duty of the Bk data in the region where the black spot pattern is recorded, but it is not limited to this. For the same pixels as the pixels where the Bk data is present, the reference to the Bk data and subsequent processing according to the reference may be performed in pixels so as to use the table shown in FIG. 7 as described above.

Second Embodiment

The embodiment above, the C, M, and Y color inks are used as a carbon-free ink, but it is not limited to these. In addition to the Y, M, and C dye inks, a black dye ink, but not containing carbon may be used to record ordinary images. Hence, five colors including the carbon Bk ink are used in total.

Figure 8:
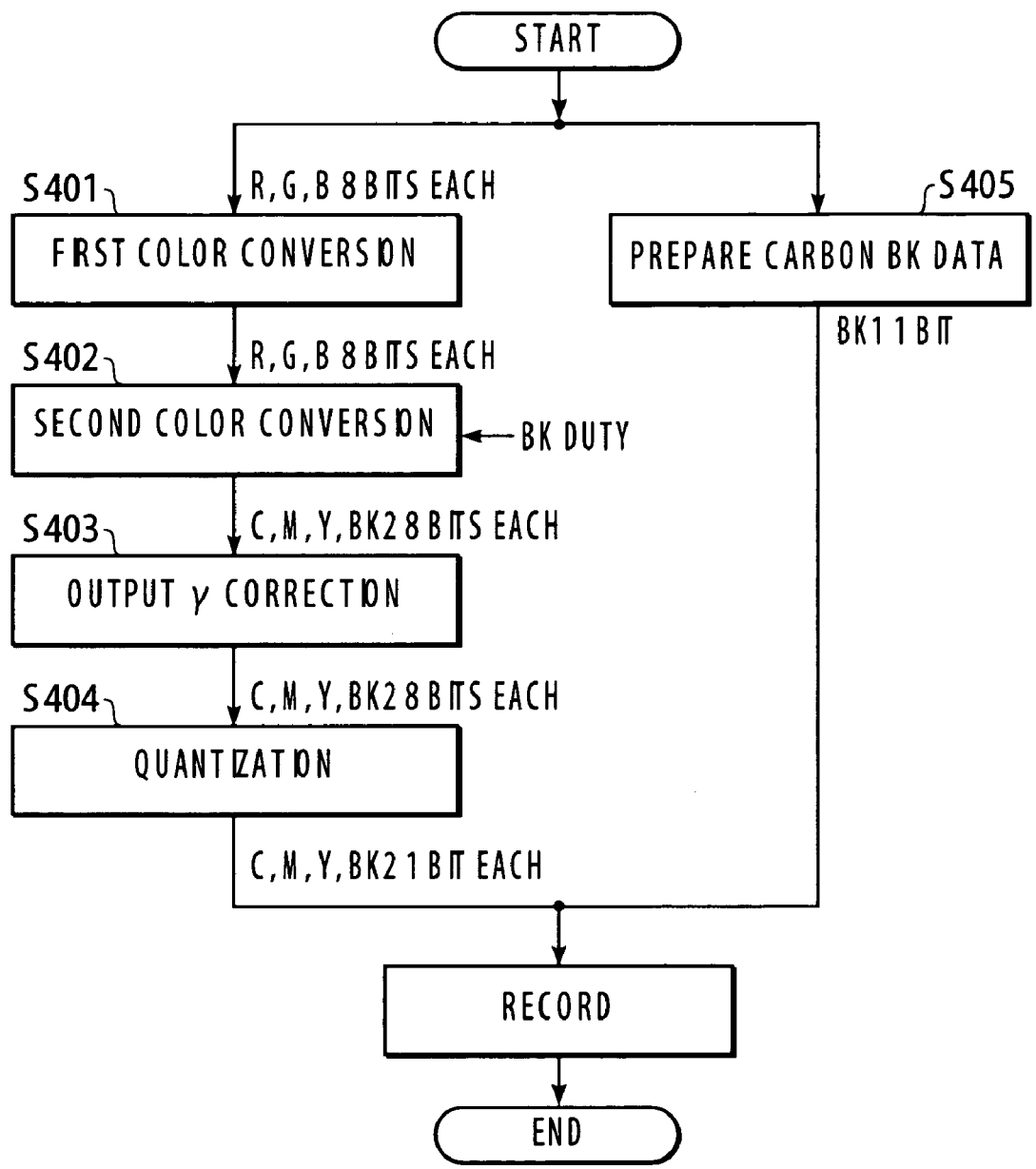
FIG. 8 is a flow chart of a procedure of image processing according to an embodiment of the present invention.

FIG. 8 is a flow chart of preparation of Bk1 data of the carbon Bk ink, Bk2 data of the black dye ink, and the Y, M, and C data of the respective color dye inks, and it is similar to FIG. 5.

Substantial difference from the foregoing embodiment is in the second color conversion in Step S402. A LUT used for the color conversion in the second embodiment prepares C, M, Y, and Bk2 data from the inputted R, G, and B data. The Bk2 data is generally prepared by undercolor removal (UCR). In the second embodiment, however, reference to the Bk1 data is made during preparation of the C, M, Y, and Bk2 data, and UCR is performed in different way from usual. Recording components of the Bk1 is removed from the portion of the Bk2 where the Bk1 data is present. Thus, C, M, Y, and Bk2 data is obtained whose recording image is corrected at the portion where the Bk1 data is present. By this image processing, black tinge on a recorded image in the black spot pattern-recording region can be prevented, even though the black spot pattern is recorded, as above.

Preparation of inks used in the embodiments will now be described.

1. Carbon Bk ink: Bk ink (first embodiment), Bk1 ink (second embodiment)

Disperse Pigment 1

After 10 g of carbon black having a specific surface area of 260 m²/g and a DBP absorption of 115 mL/100 g and a 2.5 g of p-aminobenzoic acid are mixed with 72 g of water, 1.62 g of nitric acid is added to the mixture, followed by stirring at 70° C. After a few minutes, a solution containing 1.07 g of sodium nitrite dissolved in 5 g of water is added to the mixture, followed by stirring for another one hour. The resulting slurry is filtered through a Toyo Roshi No. 2 filter paper (produced by Advantis K. K.). The collected pigment particles are thoroughly washed with water and are dried in an oven at 90° C. Water is added to the pigment to yield a disperse pigment containing 10 percent by weight of the pigment. Thus, a group expressed by the following formula is introduced to the surfaces of the carbon black.

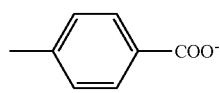

Carbon Bk Ink

The following ingredients are mixed and sufficiently stirred. Then, the mixture is filtered through a microfilter with a pore size of 3.0 µm (produced by Fuji Photo Film Co., Ltd.) under an increased pressure to prepare the black ink 1.

| | |
|---|---|
| disperse pigment 1 described above: | 30 parts |
| ammonium benzoate: | 1 part |
| trimethylolpropane: | 6 parts |
| glycerin: | 5 parts |
| diethylene glycol: | 5 parts |
| ethylene oxide adduct of acetylene glycol (Product name: Acetylenol EH): | 0.15 part |
| water: | 52.85 parts |

2. Dye inks

Y (yellow ink)

The following ingredients are mixed and sufficiently stirred. Then, the mixture is filtered through a microfilter with a pore size of 0.2 µm (produced by Fuji Photo Film Co., Ltd.) under an increased pressure to prepare the yellow ink.

| | |
|---|---|
| ethylene oxide adduct of acetylene glycol (Product name: Acetylenol EH): | 1 part |
| diethylene glycol: | 10 parts |
| glycerin: | 5 parts |
| CI Direct Yellow 86: | 3 parts |
| water: | 81 parts |

M (magenta ink)

The following ingredients are mixed and sufficiently stirred. Then, the mixture is filtered through a microfilter with a pore size of 0.2 µm (produced by Fuji Photo Film Co., Ltd.) under an increased pressure to prepare the magenta ink.

| | |
|---|---|
| ethylene oxide adduct of acetylene glycol (Product name: Acetylenol EH): | 1 part |
| diethylene glycol: | 10 parts |
| glycerin: | 5 parts |
| CI Acid Red 35: | 3 parts |
| water: | 81 parts |

C (cyan ink)

The following ingredients are mixed and sufficiently stirred. Then, the mixture is filtered through a microfilter with a pore size of 0.2 µm (produced by Fuji Photo Film Co., Ltd.) under an increased pressure to prepare the cyan ink.

| | |
|---|---|
| ethylene oxide adduct of acetylene glycol (Product name: Acetylenol EH): | 1 part |
| diethylene glycol: | 10 parts |
| glycerin: | 5 parts |
| C.I. Acid Blue 9: | 3 parts |
| water: | 81 parts |

Bk2 (black ink)

The following ingredients are mixed and sufficiently stirred. Then, the mixture is filtered through a microfilter with a pore size of 0.2 µm (produced by Fuji Photo Film Co., Ltd.) under an increased pressure to prepare the black ink.

| | |
|---|---|
| ethylene oxide adduct of acetylene glycol (Product name: Acetylenol EH): | 1 part |
| diethylene glycol: | 10 parts |
| glycerin: | 5 parts |
| CI Food Black 2: | 3 parts |
| water: | 81 parts |

Modifications

The positional information is recorded as the Bk spot pattern with the carbon-containing Bk ink according to the pen input method using a carbon-detectable camera integrated with a pen in the foregoing embodiments. However, the recording material for the positional information is not limited to the carbon-containing Bk ink, and any recording material may be used as long as a pen camera can detect it. For example, ink containing a fluorescent dye may be used instead of the carbon-containing Bk ink. In this instance, diaminostilbenesulfonic acid derivatives can be used because diaminostilbenes exhibit fluorescent characteristics. For the pen camera, a high-sensitive sensor capable of detecting ultraviolet wavelength or a filter may be used. In this instance, by recording the positional information with a bright color material, quality degradation of images including characters can be prevented. In view of image quality, the positional information recorded with the carbon-containing Bk ink may negatively affect the quality of images to be recorded including characters to some extent because the positional information is reflected as particles in human eyes, even though it is expressed by miniature dots (black spots).

The embodiments are described using an ink jet recording apparatus as a recording apparatus, but it is not limited to this. Recording in which the black spot pattern is formed with a carbon-containing material and the other colors is formed with carbon-free materials can produce the same effects.

Other Modifications

As described above, the present invention may be applied to a system including a plurality of apparatuses, such as a host computer, an interface device, a reader, and a printer, or a single apparatus, such as a copier or a fax machine.

In the present invention, the functions of the embodiments may be realized by an apparatus or system including various devices and a computer (CPU or MPU) connected with the devices. In this apparatus or system, program codes of software for realizing the functions, as shown in FIGS. 5 and 8, are supplied to the computer, and the devices are operated according to a program stored in the computer.

In this instance, the program codes of the software realize the functions. The program codes and means for supplying the codes to the computer, for example, a recording medium containing the program codes, are in part of the present invention.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for recording on one recording medium, a positional information image representing positional information corresponding to at least positions on the recording medium and the other image, using a recording apparatus that applies a recording material onto the recording medium, the method comprising:

the step of obtaining information on recording of the positional information image according to record data for recording the positional information image;

the correction step of correcting record data of said the other image so that a predetermined recording property of said the other image is varied, according to the obtained information; and the recording step of recording the positional information image and said the other image corrected, by applying a visible recording material on the recording medium.

2. The method according to claim 1, wherein the predetermined recording property is density, and the density of said the other image is reduced in the correction step.

3. The method according to claim 1, wherein the information on recording of the positional information image is recording duty in a region where the positional information image is recorded.

4. The method according to claim 1, wherein in the recording step, the positional information image is recorded with a recording material capable of being detected by a predetermined detector, and said the other image is recorded with a recording material incapable of being detected by the detector.

5. The method according to claim 4, wherein the recording material for recording the positional information image contains carbon black.

6. A recording system comprising:

a recording apparatus for perform recording by applying a recording material onto a recording medium according to image data;

a transmitter for transmitting the image data to the recording apparatus;

preparation means for preparing image data corresponding to an image to be recorded;

acquisition means for obtaining information on recording of a positional information image, according to record data for recording the positional information image, the positional information image representing positional information corresponding to positions on the recording medium; and correction means for correcting record data for recording said the other image according to the information obtained by the acquisition means, wherein the recording apparatus records the positional information image and said the other image corrected by the correction means, by applying a visible recording material on one recording medium.

7. The system according to claim 6, wherein the correction means corrects the image data to reduce density.

8. The system according to claim 6, wherein the information on recording of the positional information image is recording duty in a region where the positional information image is recorded.

9. The system according to claim 6, wherein the positional information image is recorded with a recording material capable of being detected by a predetermined detector, said the other image is recorded with a recording material incapable of being detected by the detector, and the recording material for recording the positional information image contains carbon black.

10. A recording apparatus for forming an image on a recording medium, comprising:

recording means for performing recording by applying a visible recording material onto the recording medium, the recording means recording at least one of a positional information image representing positional information corresponding to the position where the positional information image is recorded and the other image;

a control means for controlling the recording such that the recording means records the positional information image with a recording material capable of being detected by a predetermined detector, and said the other image with another recording material incapable of being detected by the detector; and correction means for correcting record data for recording said the other image, according to record data for recording the positional information image.

* * * * *